F. W. ANDREW.
COUPLING FOR IMPULSE STARTERS.
APPLICATION FILED JULY 15, 1919.
1,352,864.
Patented Sept. 14, 1920.
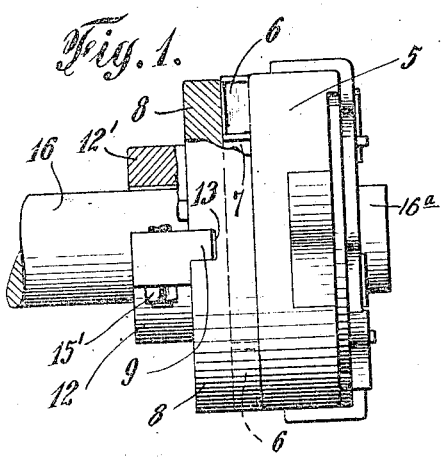
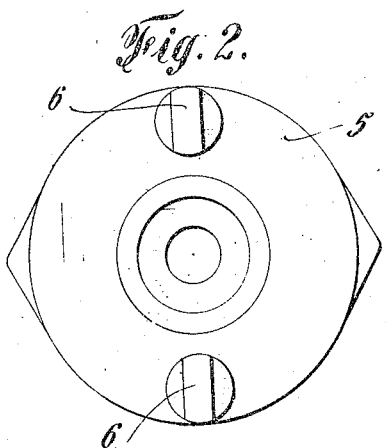
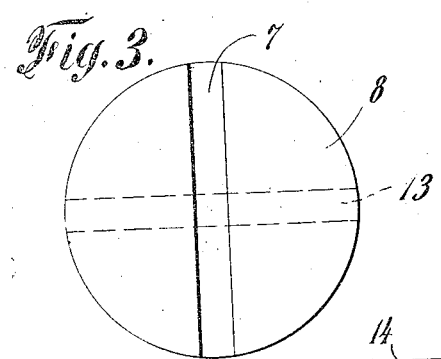
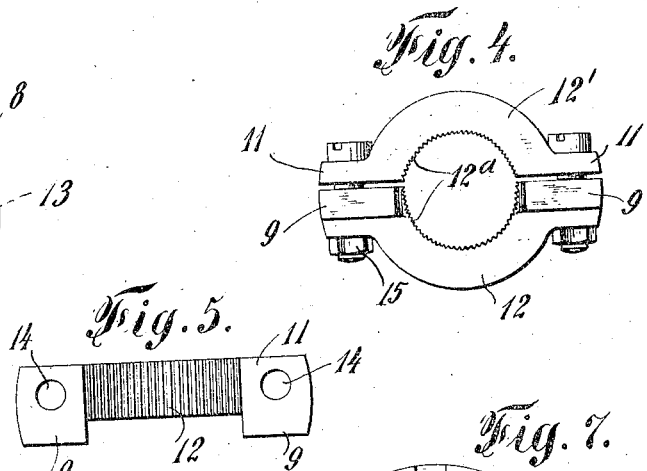
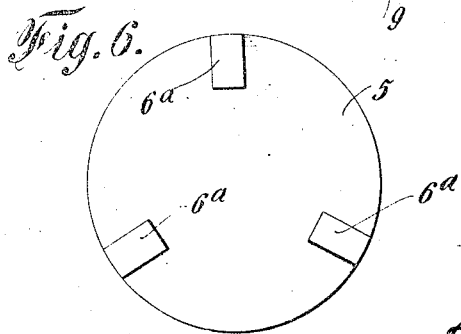
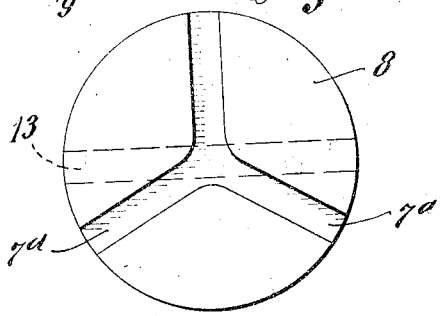
Frederick W. Andrew, Inventor
Witnesses:
Alfred Krafft
Louise Keller
By Henry Schreiter his Attorney

UNITED STATES PATENT OFFICE.

FREDERICK W. ANDREW, OF BROOKLYN, NEW YORK, ASSIGNOR TO EISEMANN MAGNETO CORPORATION, OF BROOKLYN, NEW YORK, A CORPORATION OF NEW YORK.

COUPLING FOR IMPULSE-STARTERS.

1,352,864.  Specification of Letters Patent.  Patented Sept. 14, 1920.

Application filed July 15, 1919. Serial No. 311,029.

*To all whom it may concern:*

Be it known that I, FREDERICK WILLIAM ANDREW, a citizen of the United States, and a resident of the city of New York, borough of Brooklyn, county of Kings, and State of New York, have invented certain new and useful Improvements in Couplings for Impulse-Starters, of which the following is a full, clear, and exact specification.

This invention relates to coupling devices and consists in devising the hereinafter described coupling particularly adapted for connecting the driving shaft to the driving member of an impulse starter.

A coupling constructed according to my invention is illustrated in the accompanying drawings, wherein:

Figure 1 is an elevation, a partly sectional view of the coupling as used for connecting the driving shaft to the driving member of an impulse starter;

Fig. 2 is an elevation of the driving member of an impulse starter, showing the means for connecting it with the other parts of the coupling.

Fig. 3 is a plan view of the disk, a part of the coupling, interposed between the driving member of the impulse starter and the clamp for the driving shaft;

Fig. 4 is an elevation of the clamp, viewed from the side facing the disk;

Fig. 5 is a plan view of the lower jaw of the clamp;

Fig. 6 is a view similar to Fig. 2, but showing another disposition of the protuberances on the driving member of the impulse starter;

Fig. 7 is a view of the disk like Fig. 3, but showing the groove formed correspondingly to the positions of the protuberances on the driving member illustrated in Fig. 6.

For the sake of explaining my invention, I have illustrated my new coupling device as applied to an impulse starter for connecting the driving member thereof with the driving or engine shaft, but it is obvious that my invention is not limited to such use. The essential element of my new coupling is a disk of non-metallic waterproof material which is inert (that is, remains unaffected) under the action of temperature and moisture within practical limits, and which possesses the requisite tensile strength to withstand the torsional strain to which the disk is essentially subjected in operation, without requiring the use of metallic reinforcements. I am aware that it has heretofore been proposed to make coupling disks of leather and vulcanized fiber, which is simply called fiber. As is well understood, fiber is a hard, horny substance produced from paper or other fibrous material in which the character of the fiber has been destroyed by chemical action. Leather, and particularly fiber, are subject to the action of heat, moisture and oil; they shrink and swell according to conditions. These are well known facts and on account of these objectionable properties, coupling disks of leather and fiber have proved failures. Moreover, such disks required the use of metallic reinforcements, such as rivets, to enable them to withstand the strain of operation. The foregoing and other difficulties and objections of prior coupling disks are effectively overcome by the coupling disk of my invention.

The driving part 5 of the impulse starter is provided on its rear face with the lugs or protuberances 6, arranged on radial lines, (see Figs. 2 and 6). Similarly formed lugs or protuberances 9 are formed on the flanges 11 of one of the jaws 12 and 12', preferably the lower jaw 12, of the clamp. The radial groove 7 made in the face of the disk 8 corresponds to the position and to the dimensions of the protuberances 6 on the driving part of the impulse starter; the groove 13, made on the other face of the disk 8, corresponds to the position, and to the dimensions, of the protuberances 9 extending from the flanges 11 of the jaw 12; both grooves 7 and 13 being made so the protuberances 6 and 9 will snugly fit therein. The grooves or recesses 7 and 13 of the disk 8 may be said to consist each of two radial portions or sections. Although these are shown as a continuous groove on each face of the disk, that is obviously not necessary. The particular form and arrangement of the recesses or grooves 7 and 13 are immaterial, but preferably they should permit a universal joint action in the coupling.

The jaws, 12 and 12' are substantially semi-circular in shape, though somewhat short of constituting a complete circle when set together. The laterally extending flanges 11 are perforated, the perforations 14 being in line so the bolts 15 may be passed therethrough, and the interior faces 12ᵃ of the jaws are serrated so the end of the driving shaft 16 may be securely gripped between the jaws by screwing the nuts 15' onto the correspondingly screw-threaded ends of the said bolts.

The disk 8, which constitutes the operative connection between the two rotatable members 16 and 5, is made of non-metallic waterproof material, which is amply resistant to the tortional strain exerted upon the disk in the operation of the coupling, and which will not warp or twist under the action of temperature and moisture within practical limits.

After conceiving the idea of employing a disk of some material answering the above recited requirements, and experimenting with disks made of various compositions, I found that a disk composed of textile material saturated or impregnated with a hard, non-combustible, strongly adhesive cement, substantially inert under the action of temperature and moisture, possesses the requisite properties for this purpose. Such material, in which the textile fibers are impregnated with and held together by a condensation product of phenol and formaldehyde (as described in the U. S. patent to Baekeland, No. 941,605), is sold in suitable thicknesses and is capable of being shaped by machine tools as required. One form of a material thus composed, in which the fabric consists of layers of canvas, is known in the trade as bakelite canvas. This material is capable to effect snug fitting of the parts, stands the wear and strain, and facilitates the setting together and silent running of the parts. Couplings constructed in accordance with my invention and comprising disks shaped of this bakelite canvas, have been used in the equipment of trucks and other automobile vehicles for over a year with complete success.

The grooves 7 and 13 in the disk 8 being dimensioned to snugly fit respectively the protuberances 6 of the driving member, and the protuberances 9 of the clamp, these parts of the coupling are held firmly together in their relative positions, when an adjustment in the relative positions of the shaft 16, and of the driving member 5 of the impulse starter, is to be made. Thus, the adjustment of the driving shaft relatively to the driving member of the impulse starter, which might be required quite frequently, may be readily effected, requiring merely the loosening of the nuts 15', the turning of the driven or magneto shaft 16ᵃ in the requisite direction, and then tightening the nuts 15' again to grip the shaft 16 in the jaws of the clamp in the adjusted position. The thus effected ability to retain the parts in their position prevents also the otherwise unavoidable disturbing of its alinement with the magneto shaft, whereon the driven member of the impulse starter or plain coupling is mounted.

The modified arrangement of the lugs or protuberances 6ᵃ, illustrated in Fig. 6, and of the groove 7ᵃ, illustrated in Fig. 7 are designed to maintain, more securely, the parts in alinement, but it will be understood by those skilled in the art, that the forms illustrated in Figs. 2 and 3, may be preferable from the standpoint of the manufacturer, and that they are amply sufficient for the attaining of the purposes of this invention.

The non-metallic coupling disk of my invention is more expensive than the old disks of iron or steel, but those old metallic disks were liable to rust and produced a noisy, rattling coupling, whereas my new disk is noiseless in operation and not affected by moisture. A noiseless coupling is especially desirable on automobiles.

As previously stated, my invention is particularly adapted for connecting the driving member of an impulse starter with the shaft of the engine. As is well known, these impulse starters are mounted on the magneto shaft, indicated at 16ᵃ in Fig. 1. In practice it is not possible to secure and maintain a true axial alinement of the engine shaft and the magneto shaft. To allow for this eccentric play of the two shafts, certain coupling devices of the prior art include a flexible connection. The disk 8 of my invention, although rigid, allows for any eccentricity of the shafts 16 and 16ᵃ that may occur in actual practice. The engagement between the lugs 9 on the driving shaft 16 and the groove 13 of the disk 8 is slidable in the direction of that groove. Similarly, the lugs 6 on the member 5 are in slidable engagement with the groove 7, which is at right angles to the groove 13. This produces a sort of flexible or universal joint between the shafts 16 and 16ᵃ, sufficient to take care of the eccentric play that may occur in actual use between the engine shaft and the magneto shaft, or, more broadly speaking, between the two rotatable and axially alined members to which my new coupling may be applied.

It should be observed that the lugs 6 and 9, which engage in the grooves 7 and 13 of the disk 8, are of iron or steel, like the parts from which they project. The disk of my invention thus forms a non-metallic coupling between hard metal parts and produces a silent, close-fitting and automatically adjustable joint, unaffected by temperature and moisture, and which is readily assembled and as readily taken apart. The non-metallic walls of the grooves 7 and 13 are capable of withstanding the wear and tear of the hard metallic engaging lugs 6 and 9, as has been demonstrated by actual use. No metallic reinforcements of the disk are necessary, as in the leather and fiber disks heretofore constructed. As far as I am aware, I am the first to produce a non-metallic coupling disk capable of accomplishing the foregoing results.

I claim as my invention:

1. In a coupling, a rotatable driving member and a rotatable driven member arranged substantially in axial alinement, metallic lugs projecting axially from the adjacent ends of said members, and a coupling disk arranged between the adjacent ends of said members for operatively connecting them, said disk being composed of textile material impregnated with and held together by a hardened waterproof cement, said disk being substantially inert under the action of temperature and moisture and being capable of withstanding the requisite torsional strain of operation without requiring the use of metallic reinforcements, the opposite faces of said disk having grooves or recesses for receiving the metallic lugs of said members and thereby coupling said members together, said lugs and grooves forming a silent automatically adjustable connection which allows for the eccentric play of the rotatable members.

2. In a coupling, a rotatable driving member and a rotatable driven member arranged substantially in axial alinement, metallic lugs projecting axially from the adjacent ends of said members, and a coupling disk of bakelite canvas arranged between the adjacent ends of said members, said disk having grooves or recesses in its opposite faces for receiving the metallic lugs of said members and thereby coupling said members together, said lugs and grooves forming a silent automatically adjustable connection which allows for the eccentric play of the rotatable members.

3. As a new article of manufacture, a non-metallic coupling disk for operatively connecting two axially alined rotatable members, said disk being composed of textile material impregnated with and held together by a hardened waterproof cement, said disk being substantially inert under the action of temperature and moisture and capable of withstanding the requisite torsional strain of operation without requiring the use of metallic reinforcements, the faces of said disk having grooves or recesses for the purposes set forth.

4. As a new article of manufacture, a non-metallic coupling disk for operatively connecting two axially alined rotatable members, said disk being composed of textile material impregnated with and held together by a condensation product of phenol and formaldehyde said disk being substantially inert under the action of temperature and moisture and capable of withstanding the requisite torsional strain of operation without requiring the use of metallic reinforcements, the faces of said disk having grooves or recesses for the purposes set forth.

5. As a new article of manufacture, a coupling disk of bakelite canvas for operatively connecting two axially alined rotatable members, the faces of said disk having grooves or recesses for the purposes set forth.

6. In a coupling for operatively connecting the driving member of an impulse starter to a driving shaft, a clamp composed of two complementary semi-circular jaws having interiorly roughened faces shaped to surround and grip the driving shaft, a pair of lateral extensions on each of said jaws, adjustable fastening devices engaging the extensions of both jaws for securing the jaws to the driving shaft, a pair of axially projecting lugs on said extensions, axially projecting lugs on said driving member, and a coupling disk arranged between said driving shaft and said driving member, the opposite faces of said disk having grooves adapted to receive the lugs of the driving shaft and the driving member.

7. In a coupling for operatively connecting the driving member of an impulse starter to a driving shaft, a clamp composed of two complementary semi-circular jaws having interiorly roughened faces shaped to surround and grip the driving shaft, a pair of lateral extensions on each of said jaws, adjustable fastening devices engaging the extensions of both jaws for securing the jaws to the driving shaft, axially projecting lugs on the extensions of one of said jaws, axially projecting lugs on said driving member, and a coupling disk arranged between said driving shaft and said driving member, the opposite faces of said disk having grooves adapted to receive the lugs of the driving shaft and the driving member.

FREDERICK W. ANDREW.

Witnesses:
 CHARLES S. SKINNER,
 LOUISE KELLER.